United States Patent [19]
Zocca

[11] Patent Number: 5,917,170
[45] Date of Patent: Jun. 29, 1999

[54] METHOD FOR THE EVALUATION OF INFORMATION STORED IN BAR CODES

[75] Inventor: Rinaldo Zocca, Bologna, Italy

[73] Assignee: Datalogic S.p.A., Bologna, Italy

[21] Appl. No.: 08/796,747

[22] Filed: Feb. 6, 1997

[30] Foreign Application Priority Data

Feb. 13, 1996 [DE] Germany ............................ 196 05 194

[51] Int. Cl.⁶ .................................................. G06K 7/10
[52] U.S. Cl. ................ 235/436; 235/462.29; 235/462.26
[58] Field of Search ..................................... 235/462, 463, 235/436, 469, 470, 472

[56] References Cited

U.S. PATENT DOCUMENTS

| | | | |
|---|---|---|---|
| 3,959,626 | 5/1976 | Vinal | 360/43 |
| 4,335,303 | 6/1982 | Call | 235/463 |
| 5,047,618 | 9/1991 | Kobayashi | 235/415 |
| 5,369,260 | 11/1994 | Schuessler | 235/463 |
| 5,420,849 | 5/1995 | Matsueda | 363/124 |

*Primary Examiner*—Thien Minh Le
*Attorney, Agent, or Firm*—Sughrue, Mion, Zinn Macpeak & Seas, PLLC

[57] ABSTRACT

A method for the evaluation of information stored in bar codes composed of characters is proposed, in which the bar code is exposed to light by means of a light source and the light reflected from the bar code is detected by means of a light receiving device during a relative movement between the bar code and the light receiving device in a scanning operation. The method is distinguished by the fact that the acceleration (a) of the relative movement during the scanning operation is assumed to be constant and can assume different values.

12 Claims, 2 Drawing Sheets

METHOD FOR THE EVALUATION OF INFORMATION STORED IN BAR CODES

BACKGROUND OF THE INVENTION

The invention relates to a method for the evaluation of information stored in bar codes composed of characters in accordance with the preamble of claim 1.

The method relates, on the one hand, to the use of manually guided light receiving devices, which are also referred to as bar code readers, can be designed as so-called pen readers and are manually guided over the bar code to be read. The pen reader emits light, in particular laser light, which is reflected from the bar code. The reflected light is detected by the pen reader and processed in an evaluation unit.

The method relates, on the other hand, to a stationary bar code reader (slot reader) past which the bar codes or the objects provided with the bar code are manually moved. In the case of a bar code reader of this type, the bar codes are irradiated from a stationary light source, in particular a laser light source. The light reflected from the bar code is detected by a stationary receiving device and processed by a processing unit.

In principle, the method relates to all evaluation methods in which a non-uniform relative movement is carried out between a light receiving device and a bar code from which light emitted by a light source is reflected.

The following definitions are used for the description:

A bar code is realized or applied to an object in accordance with a specific symbol standard (2/5, CODE39, EAN, CODE128, etc.).

A symbol, or bar code, is composed of a series of characters.

Each character consists of a predetermined number of dark bars with interspaces lying between them. The bars and spacings are also referred to as "elements". Within the characters, the successive bars and spacings can have different widths. This combination is unique to the symbols. These characters can be used, for example, to represent numbers, letters or else check characters.

The grid dimension and the nominal width of the smallest element of which a character can be composed are measured transversely with respect to the extent of the bars and spacings.

The nominal width of a character is a defined constant for each symbol and is expressed as a multiple of the grid dimension.

The method by which the data which depend on the width of each individual element are obtained is referred to as the scanning operation. The scanning operation can be carried out manually or by means of an automatic mechanism. It converts the width of each element into the time which is required for scanning a character. This time corresponds to the width measured by the bar code reader.

It is essential that, at the end of the acquisition of information contained in a bar code, the size of each individual element of which the code is composed is acquired. The analysis and processing of the data, which results in a conversion of the dimensions of the different elements into a sequence of ASCII characters, are referred to as decoding.

The quality of the decoding method is defined by the probability of obtaining a correct result.

It has emerged that the relative movement between the light receiving device and the bar code to be acquired is particularly non-uniform when the scanning operation is carried out manually. There is normally an acceleration at the start of the scanning operation and a deceleration at the end. This leads to distortion of the information which is read.

In a known method of this type for the evaluation of information, it is assumed that the scanning velocity during the scanning of an individual character is constant. In any case the scanning reliability based on this hypothesis is not adequate. This is due to levels of distortion caused by the non-uniform velocity during the scanning process.

SUMMARY OF THE INVENTION

Therefore, the object of the invention is to provide a method for the evaluation of information stored in bar codes composed of characters which has a very high scanning accuracy, even if the scanning velocity is not uniform.

This object is achieved, in a method of the type mentioned in the introduction, with the aid of the features listed in claim 1. A significant reduction of the levels of distortion occurring during the acquisition of the information can be achieved, thus producing a high scanning accuracy, by the fact that the acceleration of the relative movement during the scanning of a character of the bar code is assumed to be constant in a scanning operation.

An embodiment of the method in which a specific average velocity is assumed during the scanning operation of each individual character is particularly preferred.

Furthermore, an embodiment of the method is preferred in which the constant acceleration and the average velocity for each character are determined from the times which are required for the scanning of the characters, in particular successive characters, and from the nominal width of the characters.

In addition, a method is preferred in which the values of the acceleration and of the average velocity are used to calculate a compensation factor which allows optimum compensation of the levels of distortion due to a non-uniform scanning velocity.

Finally, a method is particularly preferred in which the characters which form the bar code are scanned and the results of this scanning can be stored and processed later.

DETAILED DESCRIPTION OF THE INVENTION

The invention is described in more detail below.

When a bar code is evaluated, the characters are successively evaluated, the content of a character or the information contained in this character being acquired in each case.

The following description of the method for the evaluation of information which is present in the form of bar codes composed of characters and is acquired, for example, by means of a manually guided bar code reader proceeds from known methods on the basis of which the light-dark change which is detected by the bar code reader is evaluated over time and the content of the information of the bar code is determined therefrom. The evaluation or analysis method of the type mentioned here is fundamentally known, so a more detailed discussion of it will not be given here.

Figure 1:
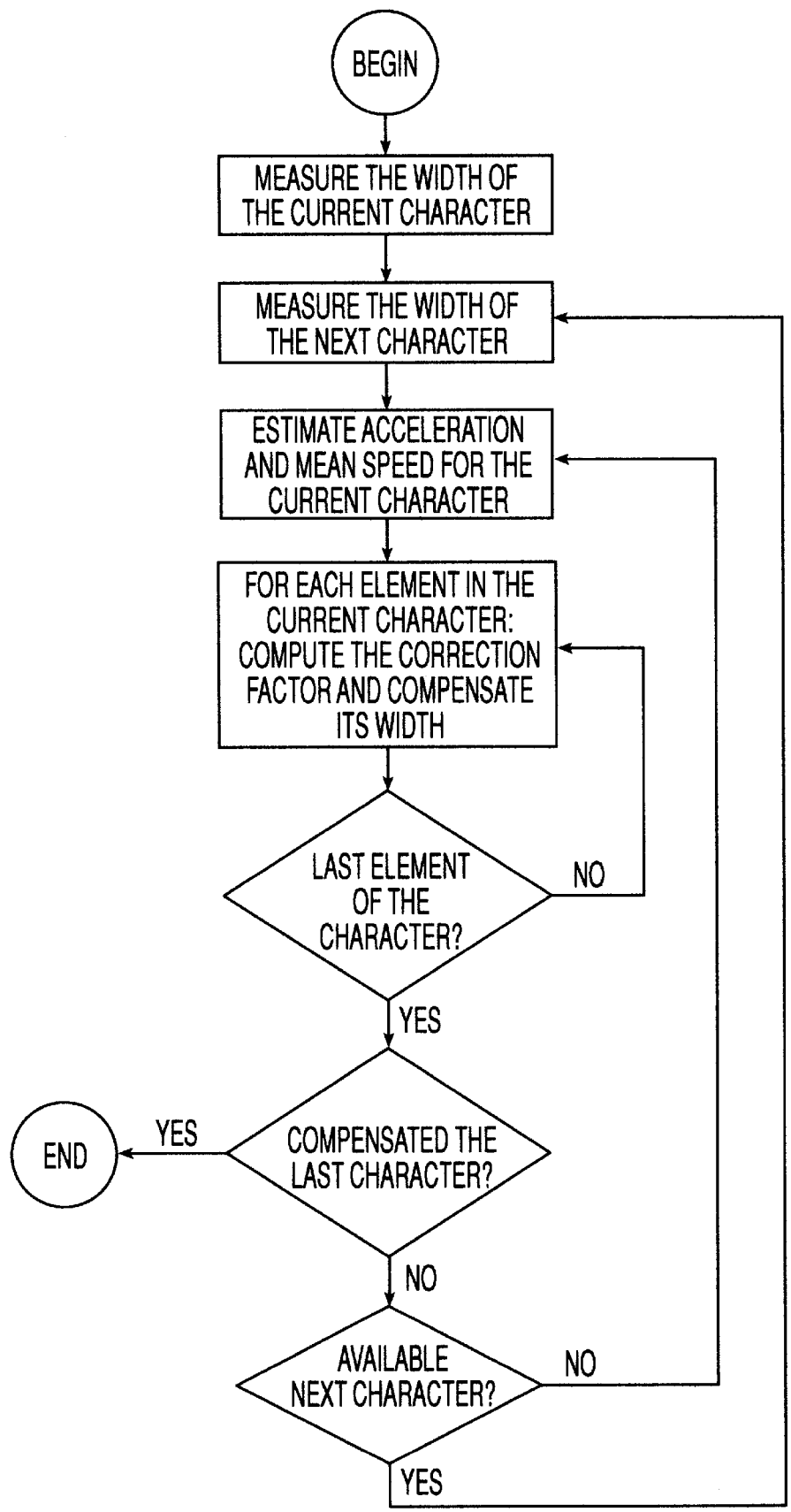
FIG. 1 is a flow chart illustrating the method of the present invention.
Figure 2:
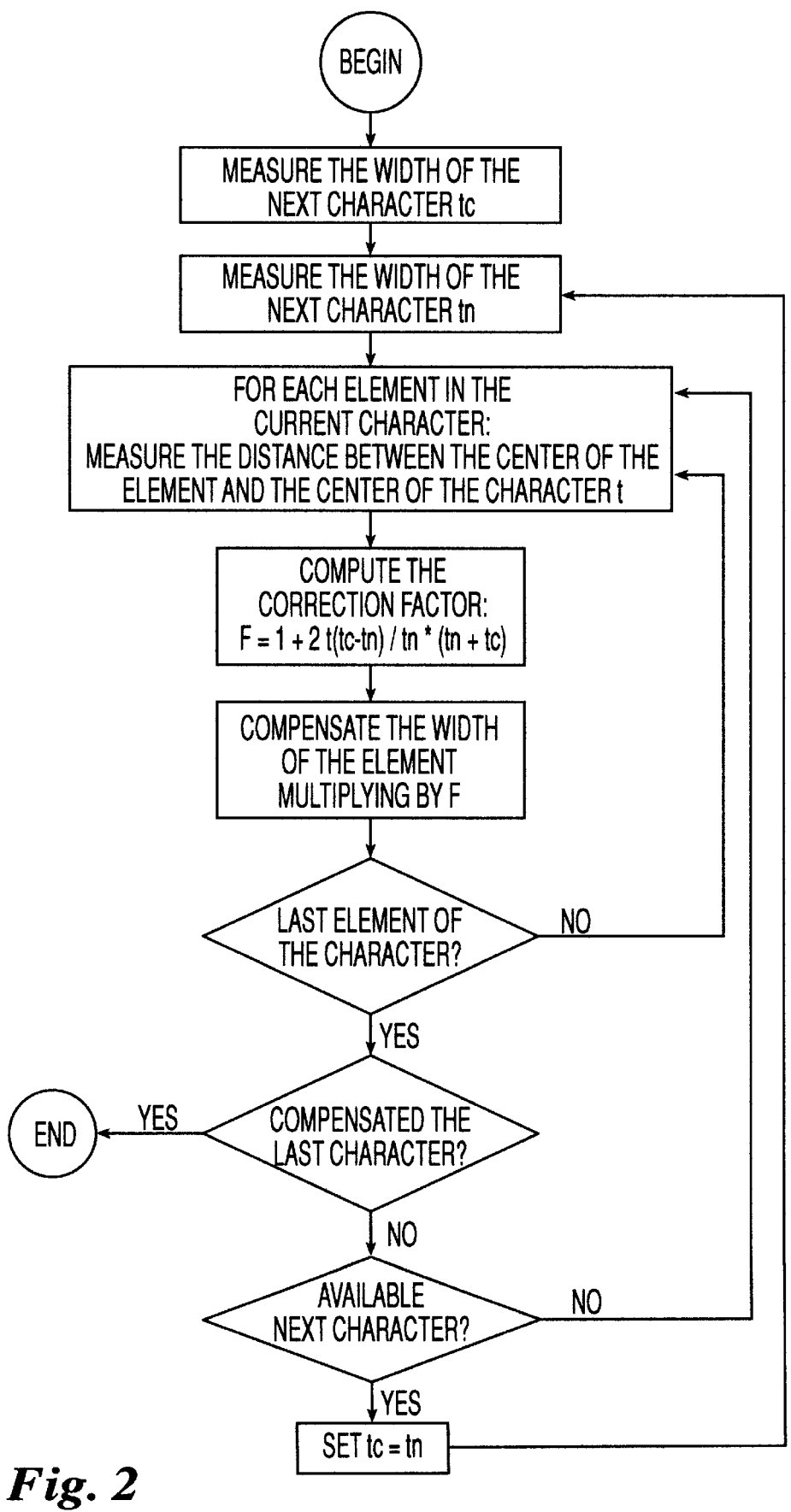
FIG. 2 is a more detailed flow chart of the method.

The method according to the invention as illustrated in the flow charts of FIGS. 1 and 2 is distinguished by the fact that at least two characters are successively scanned for the evaluation of information. In this case—as usual—the light reflected from the characters and the length of the individual characters are detected. At the same time, the time $t_c$ required for the acquisition of the first character and the time $t_n$ required for the acquisition of the directly succeeding character are acquired. Since the bar code reader, which is designed as a pen, is guided manually over the characters of the bar code to be scanned, the scanning time is different from one case to the next. In the evaluation of information which is stored in the first character, it is assumed that the manually guided bar code reader experiences a constant acceleration a while the first character is being scanned.

The nominal width m is specified here in a grid dimension, namely in a so-called modular dimension. The width of the narrowest bar or of the narrowest interspace is specified by the modular dimension, the width being measured transversely to the extent of the bars and interspaces of the character. It is assumed here in the process that the character—as usual—consists of a series of, for example, black bars, which are separated from one another by differently coloured, for example white, interspaces.

For the purpose of evaluating the data acquired by the pen reader, the value of the constant acceleration a and of the average velocity $v_m$ are calculated from the scanning times $t_c$ and $t_n$ of these characters as well as from the width m.

Equation (1) for the calculation of the constant acceleration a is specified below:

$$a=(m/t_n-m/t_c)/(t_n/2+t_c/2) \qquad (1).$$

The following equation is obtained by transforming equation (1):

$$a=2\cdot m\cdot(t_c-t_n)/t_n\cdot t_c\cdot(t_n+t_c) \qquad (2).$$

The following equation is used for the calculation of the average velocity $v_m$:

$$v_m=m/t_c \qquad (3a)$$

It is assumed that at the instant t=0 the reading device is positioned precisely at the centre point of the character. The relative movement can then be expressed by the following equation:

$$x(t)=1/2\cdot a\cdot t^2+v_m\cdot t \qquad (3b).$$

The following equations yield a compensation factor (F), which enables the distortion which is due to the non-uniform scanning movement to be compensated for in the case of each individual element which forms a character. This compensation factor depends on the distance between the centre of the element and the centre of the character t, but neither on the width $\Delta t$ of the same element nor on the nominal width m of the character. The compensation factor can therefore be expressed by the following equation:

$$F(t)=(x(t+\Delta t/2)-x(t-\Delta t/2))/(x(\Delta t/2)-x(-\Delta t/2)) \qquad (4).$$

$$F(t)=1+a\cdot t/v_m \qquad (5).$$

$$F(t)=1+2\cdot t\cdot(t_c-t_n)/t_n\cdot(t_n+t_c) \qquad (6).$$

This compensation factor is calculated anew for each element and is multiplied by the measured width, so that the width of each individual element can be obtained without a distortion.

The abovementioned calculations are repeated anew for each pair of characters. In this way, the different velocities produced by the hand of an operator can be optimally compensated for. This gives optimum scanning results during the acquisition of information contained in characters and bar codes.

For the purpose of evaluating the information contained in a first character, it is necessary to use the time for the scanning operation of the first and of the second character, the time required for the scanning of the first character being designated by $t_c$ and the time required for the scanning of the second, directly succeeding character being designated by $t_n$.

If the information of the second character is now evaluated, then the time required for the scanning of the second character is designated by $t_c$ and the scanning time required for the scanning of the following, third character is designated by $t_n$. The values $t_c$ and $t_n$ for the second and third characters are now used in equations (1) and (6), in order to acquire the content or the information of the second character.

If the content of the third character is now to be determined, then the scanning time $t_c$ for the third character and the scanning time $t_n$ for the following, fourth character are used.

It is evident that, as the evaluation of the information progresses, the value of $t_n$ in the preceding calculations is used in each case as the new value $t_c$ for the following calculation.

From the description of the scanning method, it becomes clear that when the information stored in the last character of a bar code is acquired, the acceleration a cannot be calculated using the formulae given here, since there is no longer a following, further character. In this case, the acceleration which was calculated last can be used for carrying out the evaluation method to an approximation.

An embodiment of the method in which an operator scans bar codes with a pen reader is particularly preferred. The data which are contained in a bar code and are produced with the aid of the reflected light are recorded and stored in a memory together with the scanning time which is assigned to this character. These items of information can then subsequently be processed, the acceleration a being determined from equation (2) and the average velocity $v_m$ being determined from equation (3a) for every two characters in each case.

The fact that for each character to be scanned the acceleration a, which is assumed to be constant, is calculated from equation (1), the average velocity $v_m$, which is assumed for the scanning, is calculated from equation (3a) and the compensation factor for each element is calculated from equation (6) means that a very high degree of freedom from distortion, and hence a very high reading accuracy, is achieved in the evaluation of the information stored in the bar code.

The overall impression given by what has been stated above is that the method described here can always be employed when there is a non-uniform relative movement between a light receiving device, which is also referred to as a reading device, and a bar code to be scanned. As stated, this relative movement is produced not only when a pen reader is guided over a bar code to be scanned, but also when an object provided with a bar code, for example a pass, is guided manually through a stationary reading system, for instance a supervisory system for entrances and exits. It is also conceivable to use automatic analysis stations for this method, in which the scanning operation of the code is carried out with the aid of mechanically moved parts, for example with the aid of rotating or oscillating mirrors, the velocity of the scanning operation not being constant.

What is claimed is:

1. Method for the evaluation of information stored in a bar code composed of a plurality of characters, in which the bar code is exposed to light by means of a light source and the light reflected from the bar code is detected by means of a light receiving device during a scanning operation carried out with a non-uniform relative movement between the bar code and the light receiving device, wherein a compensation of the acceleration (a) of relative movement between the bar code and the light receiving device is carried out in order to compensate distortions due to the non-uniformity of the relative movement produced during the scanning of the code, said acceleration (a) being assumed to be constant for each one of the characters of the bar code and varying over different characters.

2. Method according to claim 1, wherein each character of the bar code is composed of a plurality of elements, each one having a nominal width (m), said compensation being carried out for each element of a character.

3. Method according to claim 2, wherein the nominal width (m) of a character of the bar code is determined in a grid dimension.

4. Method according to claim 1, wherein said compensation comprises the step of calculating a compensation factor (F) which is proportional to the acceleration (a) of the relative movement between the bar code and the light receiving device.

5. Method according to claim 4, characterized in that the compensation factor (F) is used only when the distortion due to the non-uniformity of the relative movement during the scanning is at such a high level that the scanning method cannot be carried out without compensation.

6. Method according to claim 1, wherein the acceleration (a) for each character is calculated on the basis of the time (tc) for the scanning of a character and the time (tn) for the scanning of a following or preceding character.

7. Method according to claim 6, wherein the acceleration (a) during the scanning operation of a character is estimated on the basis of the times (tc, tn) of the scanning operation and of the width (m) of the character.

8. Method according to claim 6, wherein an average velocity (vm) for each character of the bar code is assumed, said average velocity being estimated on the basis of the times (tc, tn) of the scanning operation and of the width (m) of the character.

9. Method according to claim 1, characterized in that a bar code is scanned, and in that the scanning results and the time required for the scanning of each character are stored, and in that the data are processed at a later point in time.

10. Method according to claim 1, characterized in that the light receiving device is designed as a manually movable pen reader.

11. Method according to claim 1, characterized in that the light receiving device is arranged such that it is stationary, and in that the bar bode is guided manually past said device.

12. Method according to claim 1, characterized in that the bar code is scanned with the aid of moved mechanical parts, which effect a non-uniform scanning velocity.

* * * * *